(No Model.)

C. F. MUDGE.
CANNING APPARATUS.

No. 346,122. Patented July 27, 1886.

WITNESSES
G. W. Nottingham
J. E. Jones

INVENTOR
Charles F. Mudge
By H. A. Seymour, Attorney

UNITED STATES PATENT OFFICE.

CHARLES F. MUDGE, OF ESKRIDGE, KANSAS.

CANNING APPARATUS.

SPECIFICATION forming part of Letters Patent No. 346,122, dated July 27, 1886.

Application filed February 13, 1886. Serial No. 191,849. (No model.)

*To all whom it may concern:*

Be it known that I, CHARLES F. MUDGE, of Eskridge, in the county of Wabaunsee and State of Kansas, have invented certain new and useful Improvements in Canning Apparatus; and I do hereby declare the following to be a full, clear, and exact description of the invention, such as will enable others skilled in the art to which it appertains to make and use the same.

My invention is an improvement in canning apparatus.

In putting up fruit or vegetables in glass cans or jars it is customary to place the jars with the fruit therein in water in boilers and heat the water until it boils, thereby cooking the fruit or vegetable, and filling the portion of the jar not occupied with the fruit with steam, placing the covers thereon while the steam is still coming off, thus excluding the air, the steam when condensed forming a partial vacuum within the jar. During the process of cooking or boiling a churning process takes place. This wastes the form of the article, and the flavor of the fruit escapes with the steam, the amount depending upon the time required to cook the fruit. It becomes of importance, then, to provide some means for retaining the rich flavors and cooking the fruit as speedily as possible, and since families almost universally put up more or less fruit, it is desirable that there should be some inexpensive and effectual means for retaining the flavors and cooking the fruit.

The object of my present invention is to provide a simple and inexpensive device to drive out the oxygen in the jar and fruits, causing them to hold their natural flavor, to be used in connection with an ordinary wash-boiler or kettle or other convenient vessel for holding the steam which is set free about the jar, and compressing it into the open mouth of the jar containing the fruit, and about the jar, thereby preventing the escape of the flavors, and causing the fruit, &c., to be cooked more rapidly than heretofore; and with these ends in view my invention consists in certain features of construction and combinations of parts as will be hereinafter described, and pointed out in the claims.

Figure 1:
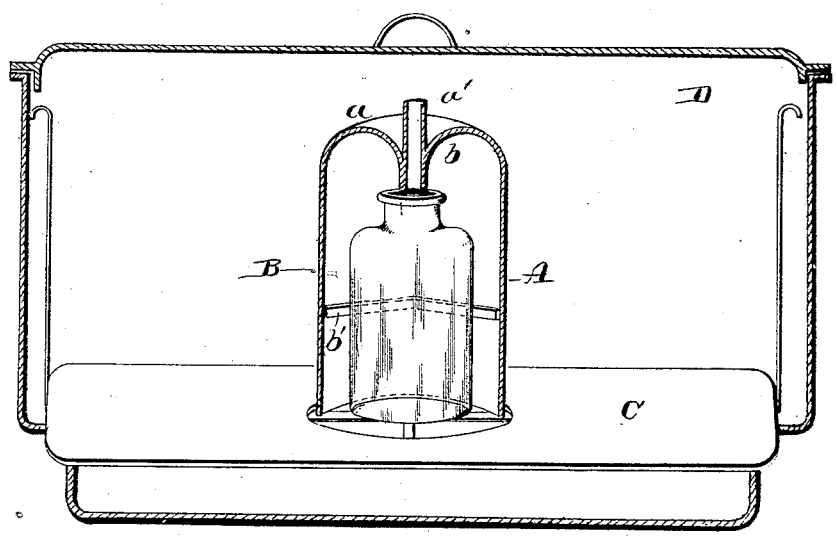
Figure 2:
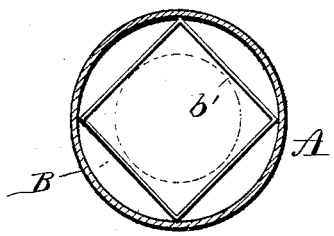

In the accompanying drawings, Figure 1 is a sectional view of the drum or cover in position over a jar; and Fig. 2 is a view of the cover.

A represents the drum or cover. It consists, preferably, of a hollow cylinder of thin metal, tinned sheet iron, for example, open at the bottom, and provided with a curved top, $a$, having a depressed central portion in which a vent, $a'$, is located. The drum A is somewhat deeper, and has a diameter considerably greater than the jar over which it is placed, leaving a steam or hot-air space, B, between the jar and drum or cover, and a steam-chamber, $b$, above the jar. The jar is held in place by a wire frame, $b'$, within the drum or cover. The jars may be set in a suitable frame, C, in a boiler, D, and the drums A placed singly one over each jar, or the drums may be attached to a frame in positions corresponding to the positions of the jars, and lowered over the jars and removed therefrom together. The steam generated from the water about the jar and within the drum is compressed within and about the top of the jar, its heat transmitted to the contents of the jar and the contents thereby rapidly cooked, while the delicate flavors which are ordinarily lost by escaping with the steam are retained to a very great extent and the form of the fruit is not changed.

It is evident that other forms of drums than that shown may be employed without departing from the spirit and scope of my invention, hence I do not wish to limit myself strictly to the form and construction herein set forth; but, Having fully described my invention, what I claim as new, and desire to secure by Letters Patent, is—

1. The combination with a boiler, a support therein above the bottom of the boiler, and a jar resting on said support, of the drum or cover placed over the jar, the said drum or cover being open at the bottom, and having a restricted opening or vent in the top, substantially as set forth.

2. As a new article of manufacture, a drum for incasing a jar of fruit or other article within a boiler, the said drum having an open bottom and closed top, the latter having a depressed central portion and a vent-hole, the said vent-hole being located in the depressed portion of the top, substantially as set forth.

In testimony whereof I have signed this specification in the presence of two subscribing witnesses.

CHARLES F. MUDGE.

Witnesses:
M. R. MUDGE,
F. W. KNEELAND.